(12) United States Patent
Connor

(10) Patent No.: US 6,795,864 B2
(45) Date of Patent: Sep. 21, 2004

(54) SYSTEM USING LOOKUP SERVICE PROXY OBJECT HAVING CODE AND REQUEST RATE FOR MANAGING RATE AT WHICH CLIENT CAN REQUEST FOR SERVICES FROM SERVER ARE TRANSMITTED

(75) Inventor: William H. Connor, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 793 days.

(21) Appl. No.: 09/750,555

(22) Filed: Dec. 28, 2000

(65) Prior Publication Data

US 2002/0087714 A1 Jul. 4, 2002

(51) Int. Cl.[7] .......................... G06F 15/16; G06F 13/72

(52) U.S. Cl. ...................... 709/232; 709/225; 709/203; 709/233; 710/33; 710/34; 710/60

(58) Field of Search ................................ 709/203, 225, 709/232, 233; 710/33, 34, 60

(56) References Cited

PUBLICATIONS

Sun Microsystems, Inc., "Jini Technology Core Platform Specification" Version 1.1, Oct. 2000. pp. 1–126.
Sun Microsystems, Inc., "Jini Architectural Overview", Jan. 1999. pp. 1–23
Sun Microsystems, Inc., "Jini Technology Executive Overview", Revision 1.0, Jan. 1999. pp. 1–6.
Sun Microsystems, Inc., "Jini Architecture Specification", Version 1.1, Oct. 2000. pp. 1–20.

*Primary Examiner*—Krisna Lim
(74) *Attorney, Agent, or Firm*—Meyertons Hood Kivlin Kowert & Goetzel, P.C.; B. Noël Kivlin

(57) ABSTRACT

Provided is a method, system, and program for enabling a client to access a service, wherein the client is capable of communicating with a server. The client accesses an object from the server that includes code to enable the client to access the service. The accessed object includes a request rate indicating a rate at which the client transmits requests for the service. The client generates requests for the service using code included in the object accessed from the server. The client then transmits the generated requests for the service at the request rate included in the object.

54 Claims, 2 Drawing Sheets

SYSTEM USING LOOKUP SERVICE PROXY OBJECT HAVING CODE AND REQUEST RATE FOR MANAGING RATE AT WHICH CLIENT CAN REQUEST FOR SERVICES FROM SERVER ARE TRANSMITTED

BACKGROUND OF THE INVENTION

1. Field of the Invention

The present invention relates to a method, system, and program for managing the rate at which client requests for a service are transmitted.

2. Description of the Related Art

In network computing systems, numerous client computers may attempt to access a server providing access to resources over a network, such as the Internet. The server may queue requests. However, if the request load is particularly high, then the number of requests may exceed the server queue depth, which results in the server responding with a connection unavailable error message.

One prior art solution for handling server overload is a server throttle that limits the number of requests that are transmitted from the network to the server request queue. The server throttle accumulates client requests from the network directed toward the server in a server throttle queue and manages the transfer of client requests from the throttle queue to the server request queue in a manner that does not overload the server.

Although this solution of a server throttle has proven somewhat effective, loading client requests at the server throttle can place certain burdens backstream through the network infrastructure to the client. Moreover, server throttles are unable to control the load the clients place on the server.

Thus, there is a need in the art for an improved techniques for managing high request loads on a network resource, such as a server.

SUMMARY OF THE PREFERRED EMBODIMENTS

Provided is a method, system, and program for enabling a client to access a service, wherein the client is capable of communicating with a server. The client accesses a proxy object from the server that includes code to enable the client to access the service. The accessed proxy object includes a request rate indicating a rate at which the client transmits requests for the service. The client generates requests for the service using code included in the proxy object accessed from the server. The client then transmits the generated requests for the service at the request rate included in the proxy object.

In further implementations, the request rate is dynamically adjusted depending on a request load for the service. The adjusted request rate is then communicated to the client. After receiving the adjusted request rate, the client submits requests for the service at the adjusted request rate.

In still further implementations, the client comprises a service provider system, the object comprises a lookup proxy service object, and the service comprises a lookup service that enables the service provider system to communicate with the server to register and access service proxy objects with the server at a lookup service request rate.

Still further, the registered service proxy objects with the server enable an additional client to access the service through the service provider system over a network. The registered service proxy object includes a service request rate indicating a rate at which the additional client transmits requests to access the service to the service provider system.

BRIEF DESCRIPTION OF THE DRAWINGS

Referring now to the drawings in which like reference numbers represent corresponding parts throughout.

DETAILED DESCRIPTION

Figure 1:
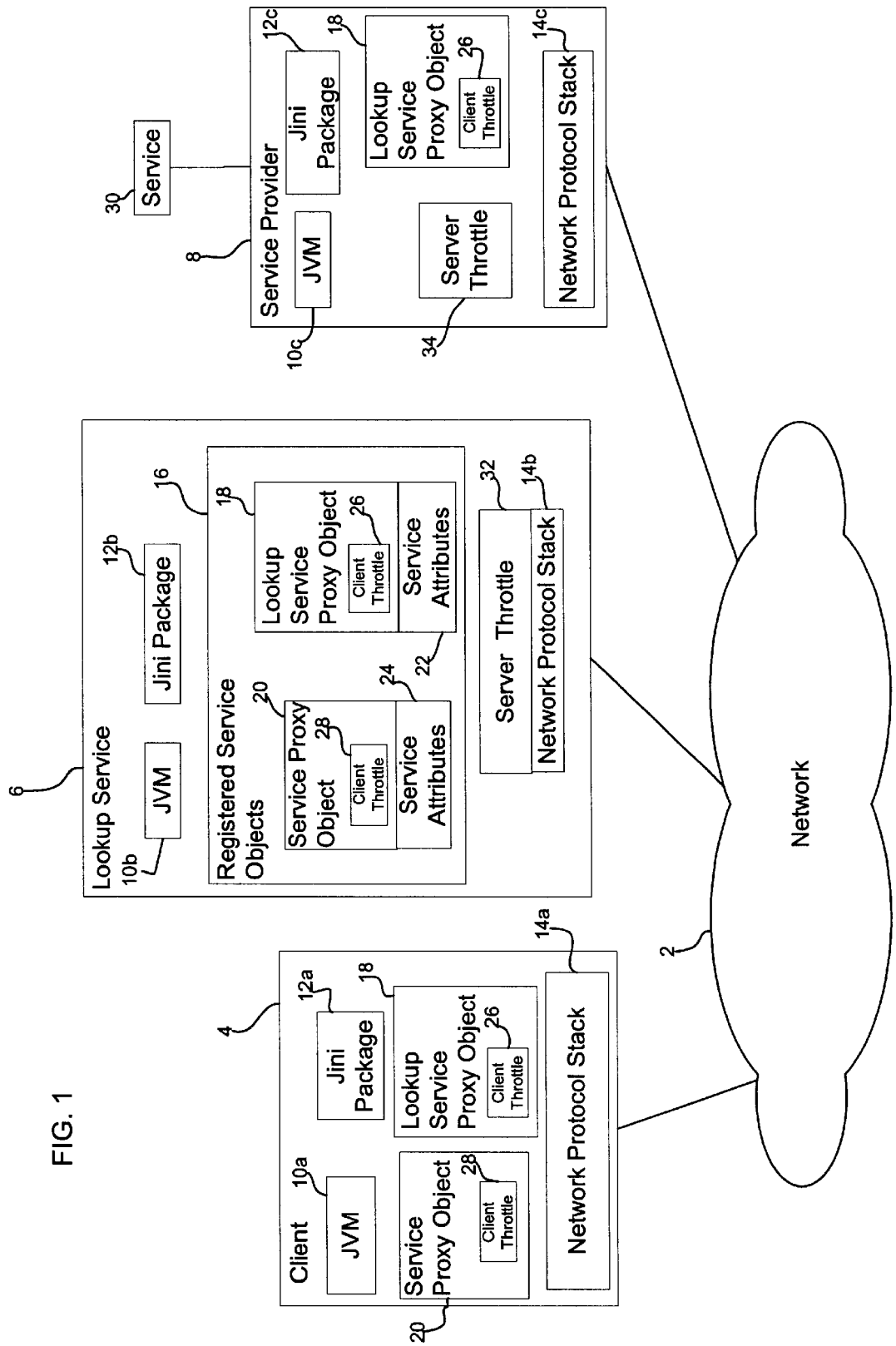
FIG. 1 illustrates a network computing architecture in which preferred embodiments are implemented.

In the following description, reference is made to the accompanying drawings which form a part hereof and which illustrate several embodiments of the present invention. It is understood that other embodiments may be utilized and structural and operational changes may be made without departing from the scope of the present invention.

Overload Problems in Distributed Computing Environments

The general problem of high server loads has been observed in the Sun Microsystems, Inc. Jini distributed computing system.** Jini provides a set of program methods and interfaces to allow network users to locate, access, and share network resources, referred to as services. The services may include hardware devices, software devices, applications, storage resources, communication channels, etc. Services are registered with a central lookup service server, which provides a repository of services. A network participant may review the available services at the lookup service and access service proxy objects that enable the user to access the service through the service provider. A "proxy object" is an object that represents another object in another space, such as a resource at a remote server, to enable access to that resource or object at the remote location. Network users may "lease" a service, and access the proxy object implementing the service for a period of time.

**JINI and JAVA are trademarks of Sun Microsystems, Inc.

A service provider discovers lookup services and then registers service proxy objects and service attributes with the discovered lookup service. In Jini, the service proxy object is written in the Java** programming language, and includes methods and interfaces to allow users to invoke and execute the service object located through the lookup service. A client accesses a service proxy object from the lookup service using Java interfaces. The service proxy object provides Java interfaces to enable the client to communicate with the service provider and access the service available through the service provider. In this way, the client uses the proxy object to communicate with the service provider to access the service.

**JINI and JAVA are trademarks of Sun Microsystems, Inc.

A Jiro station makes available thousands of Jini services in a single Java Virtual Machine, such as numerous network storage services. A Jiro station may attempt to register thousands of storage services with a lookup service to make available to users. Such a registration load on the lookup service can degrade the lookup service performance and cause the lookup service to respond with an error to the Jiro station attempting to register the services. A similar problem has been observed with a master lookup service that accumulates registered services for numerous slave lookup services that may register services for a particular subnet. If the subnet comes on line after a down period, then the slave lookup service may have thousands of services to register with the master lookup service. Such a storm of service registrations can also overload the lookup service.

The described implementations provide a solution to this problem of server overload during high load periods where a storm of access requests may be received by the server or lookup service.

High Load Management Architecture

FIG. 1 illustrates an implementation of a network computing architecture using Jini technology. A network 2 allows for communication among a client 4, lookup service 6, and service provider 8. The network 2 may comprise the Internet, an Intranet, a LAN, etc., or any other network system known in the art, including wireless and non-wireless networks. The client, 4 lookup service 6, and service provider 8 systems may comprise any computational device known in the art and each include a Java Virtual Machine (JVM) 10a, b, c and a Jini package 12a, b, c. The Jini package 12a, b, c includes all the Java methods and interfaces needed to implement the Jini network environment in a manner known in the art. The JVM 10a, b, c translates methods and interfaces of the Jini package 12a, b, c, as well as the methods and interfaces of downloaded service objects, into bytecodes capable of executing on the client 4, lookup service 6, and service provider 8 computer platform.

Each system 4, 6, and 8 includes a network protocol stack 14a, b, c to enable communication over the network 2. The network protocol stack 14a, b, c provides a network address for the device 4, 6, 8, such as a Transmission Control Protocol/Internet Protocol (TCP/IP) address, support for unicast and multicast broadcasting, and a mechanism to facilitate the downloading of Java files. The network protocol stack may also include the communication infrastructure to allow objects, including proxy objects, on the systems 4, 6, and 8 to communicate, such as the Common Object Request Broker Architecture (CORBA), Remote Method Invocation (RMI), TCP/IP, etc.

The lookup service 6 provides a Jini lookup service in a manner known in the art, including registered lookup service proxy objects that are made available to client computers. In FIG. 1, the lookup service 6 maintains registered service objects 16, including a lookup service proxy object 18 that enables users, such as client 4 and service provider 8, to access the lookup service 6 and one or more service proxy objects 20 registered by service providers 8. Associated with each service proxy object 18 and 20 are service attributes 22 and 24 that provide descriptive attributes of the service proxy objects 18 and 20 that the client 4 may review when determining registered service proxy objects to access from the lookup service 6.

The service provider 8 would register a service proxy object 20 with the lookup service 18 to allow other systems in the network access to the service 30 resource at the service provider 8. As discussed, the service 30 may comprise any hardware or software resource known in the art. In FIG. 1, the service 30 is shown as external to the service provider 8 system, such as the case if the service 30 comprises an external device such as a storage subsystem, printer, network, etc. Alternatively, the service 30 may comprise a computational resource within the service provider 8. Clients 4 would download the service proxy object 20 from the lookup service 6. The client 4 would execute methods and interfaces in the service proxy object 20 to communicate with the service provider 8 to access the service 30. Similarly, clients 4 and service provider 8 would download the lookup service proxy object 18 from the lookup service 6 and execute methods and interfaces in the lookup service proxy object 18 to communicate with the lookup service 6 to access and register service proxy objects 20. The registered service objects 16 comprise the services available through the lookup service 6. Further details on how clients may discover and download the lookup service and service objects and register service objects are described in the Sun Microsystem, Inc. publications: "Jini Architecture Specification" (Copyright 2000, Sun Microsystems, Inc.) and "Jini Technology Core Platform Specification" (Copyright 2000, Sun Microsystems, Inc.), both of which publications are incorporated herein by reference in their entirety.

In the architecture of FIG. 1, the service provider 8 functions as a client when downloading the lookup service proxy object 18 from the lookup service 6 and when invoking lookup service proxy object 18 methods and interfaces to register a service proxy object 20 with the lookup service 6. When registering service proxy objects 20 with the lookup service 6, the registered service objects 16 comprises the service the service provider 8 is accessing.

Each service object 18 and 20 further includes a client throttle 26 and 28 that provides rules that regulate how users, such as clients 4 and service providers 8, submit requests for services, such as service 30 and registered service objects 16. For instance, the client throttle 28 for the service proxy object 20 provides methods and interfaces that regulate how the client 4 submits requests for the service 30 to the service provider 30. If the service provider 30 can only process requests serially, then the client throttle 28 may limit the client to sending only one request at a time. Further, the client throttle 28 may specify a time delay between the submission of requests for the service 6. Similarly, the client throttle 26 for the lookup service proxy object 18 would regulate how service providers 8 submit requests to register service proxy objects 20 with the lookup service 6. For instance, the client throttle 26 may limit the service provider 8 to submitting registrations serially or time delay a subsequent registration.

Through the client throttle 28 parameters, the service provider 8 that generates the service proxy object 20 may control how the client 4 submits requests for services 30. Similarly, the lookup service 6 that generates the lookup service proxy object 18 can set client throttle 26 parameters to control how service providers 8 may submit requests to register service proxy objects. The client throttle 26 would also regulate how subnets or JIRO stations that could potentially register thousands of service proxy objects. In this way, the client throttles 26 and 28 can avoid the occurrence of network storms of requests by regulating the rate at which clients transmit requests.

In certain implementations, the client throttles 26 and 28 may be dynamically adjusted depending on the current load at the service provider 6, 8 providing the service 16, 30. In this way, client throttles 26 and 28 in different service proxy objects 18 and 20 may use different rates to control submission of requests, depending on the expected and current load at the service providers 6, 8. The adjusted client throttle request rate may be communicated to the clients accessing the service. Further, the service provider 6, 8 may register a new service service object 18, 20 with the lookup service 6 to update the service proxy object 18, 20 with the adjusted client throttle 26, 28. In further embodiments, the service provider 6, 8 could directly provide an updated client throttle 26, 28 to the client 4, 8 when the client is communicating with the service provider 8 to update the client throttle 26, 28 used by the client 4, 8.

In certain implementations, the client throttles 26, 28 would include some queuing methodology to handle resource requests received at a rate that exceeds the rate at which the requests can be processed. Queuing methodologies include the use of an ordered list of requests that are processed in the list according to an ordering rule, e.g., First-in-First-Out (FIFO), etc. The term queuing may also refer to other techniques for handling requests received at a rate exceeding the processing rate, such as blocking, request refusal, or any other operation known in the art to postpone processing of the requests. The client throttle 26, 28 provides rules to determine how queued requests are accessed and submitted to the service provider 6, 8.

The service providers 6, 8 may also include server throttles 32, 34 that regulate how requests are submitted to the service providers 6, 8. The server throttles 32, 34 would provide a queue to queue requests transmitted over the network 2 and received at the network protocol stacks 14b, c, and then manage how requests for the services 16, 30 are transmitted to the service provider 6, 8 to process.

Figure 2:
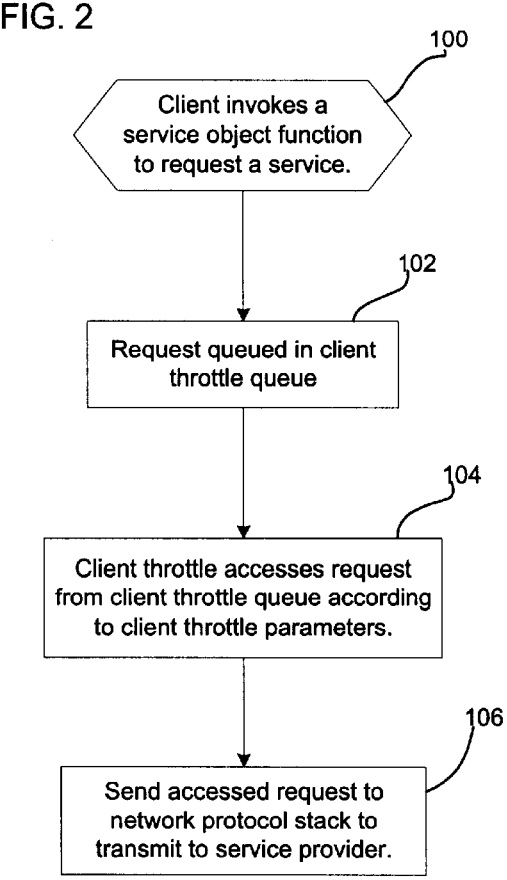
FIG. 2 illustrates logic implemented in a proxy object that controls how a client transmits requests for a service to a server in accordance with certain implementations of the present invention.

FIG. 2 illustrates logic implemented in the service proxy objects 18, 20 to manage client 4, 8 requests for services 16, 30. At block 100 the client 4, 8 invokes a request for a service 16, 30 at the service provider 6, 8. The request is queued (at block 102) in a client throttle queue. Independently, a client throttle function accesses (at block 104) one or more requests from the client throttle queue according to the request rate specified in the client throttle 28 and sends (at block 106) the request to the network protocol stack 14a, c to transmit to the service provider 6, 8.

Figure 3:
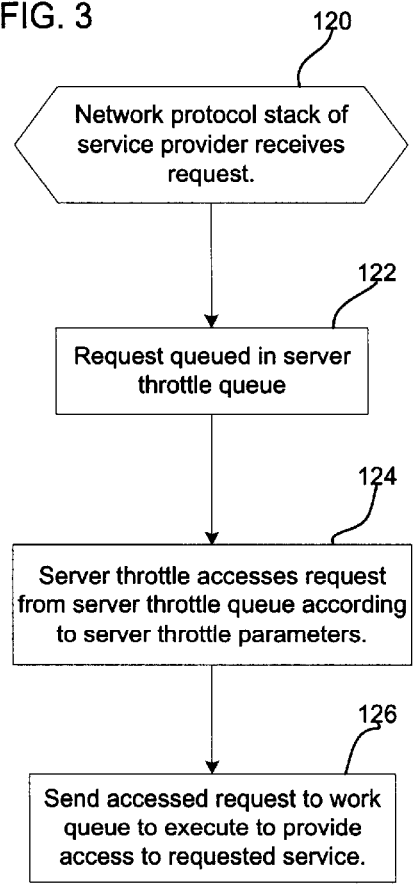
FIG. 3 illustrates logic implemented in a server to manage how requests for a service are queued and accessed at the server in accordance with certain implementations of the present invention.

FIG. 3 illustrate logic implemented in a service throttle 32, 34 to manage client requests for the service at the server end 6, 8. At block 120, the network protocol stack 14b, 14c receives a request for a service 16, 30. The request is queued (at block 122) in the server throttle queue. Independently, a service throttle function accesses (at block 124) one or more requests from the server throttle queue according to the request rate specified in the server throttle 32, 34 and sends (at block 126) the request to the service object or interface that will provide access to the service.

As discussed, the client throttle may be configured to accommodate the processing needs of the service. For instance, if the lookup service 6 processes requests serially, then the client throttle may only transmit registration requests serially to match the processing capabilities of the service 6. Alternatively, the service may set the client throttle to delay request transmission or limit the number of concurrent request transmissions The described implementations provide a technique for use in systems where a client downloads a proxy object available at a remote server to access a service available at the remote server or another service provider server. A client throttle rate is included in the proxy object to controls the rate at which the client submits requests for the service. By controlling the rate at which the client transmits requests for the service, the overall load capacity the client places on the network and server resources is controlled and limited. Further, the server that generated the proxy object may dynamically adjust the rate depending on the request load for the service. This aspect allows the server to optimally adjust the request rate depending on the current and expected load. In this way, the server providing access to the service can prevent the occurrence of a network storm where a flood of requests overload the network and server, resulting in timeouts and other errors. The client throttle provides a load management technique to control client request transmissions in order to prevent the client from overloading both the network and the server, and other downstream components, with requests.

What follows are some alternative implementations.

The described implementations include a method, apparatus or article of manufacture using standard programming and/or engineering techniques to produce software, firmware, hardware, or any combination thereof. The term "article of manufacture" as used herein refers to code or logic implemented in one or more hardware logic devices (e.g., an integrated circuit chip, Field Programmable Gate Array (FPGA), Application Specific Integrated Circuit (ASIC), etc.) or implemented in one or more computer readable media (e.g., magnetic storage medium (e.g., one or more hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code of the described implementations may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The implementations were described with respect to the Sun Microsystems, Inc. Jini network environment that provides distributed computing. However, the described technique for client side throttling may be implemented in alternative network environments where a client downloads an object or code from a server to use to access a service and resources at that server. In such network environments, the server may set the client throttle parameters to control the rate at which the client submits requests, where the rate is based on the current and/or expected load at the server.

In the described implementations, the client communicated with the server over a network, such as the Internet. In alternative embodiments, the client and server may be executing on the same operating system platform, i.e., separate threads or processes multitasking in the operating system. In such case, the client would request a service proxy object and resources from the server using operating system functions, and the client throttle the client receives form the server regulates the rate at which the client submits requests to the server through the operating system messaging system.

The foregoing description of the implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for enabling a client to access a service, wherein the client is capable of communicating with a server, comprising:
    accessing, with the client, a proxy object that includes code to enable the client to access the service from the server, wherein the accessed proxy object includes a request rate indicating a rate at which the client transmits requests for the service;
    generating requests, with the client, for the service to the server using code included in the proxy object accessed from the server; and
    transmitting, with the client, the generated requests for the service to the server at the request rate included in the proxy object.

2. The method of claim 1, wherein the request rate causes the client to serially transmit requests for the service at the request rate.

3. The method of claim 1, wherein the request rate causes the client to delay submitting a subsequent request for the service for a period of time indicated in the request rate.

4. The method of claim 1, wherein the request rate causes the client to concurrently submit a predetermined number of requests indicated in the proxy object for the service.

5. The method of claim 1, wherein the request rate comprises a maximum request rate.

6. The method of claim 1, wherein the client accesses the proxy object from the server.

7. The method of claim 1, wherein the client accesses the proxy object from a lookup service at a lookup server.

8. The method of claim 1, wherein the server performs:
    queuing requests for the service; and
    processing the queued requests for the service at a server rate.

9. The method of claim 1, further comprising:
    dynamically adjusting the request rate depending on a request load at the server for the service.

10. The method of claim 9, wherein the request rate is adjusted depending on the request load for the service at the server, further comprising:
    communicating the adjusted request rate to the client, wherein after receiving the adjusted request rate the client submits request for the service at the adjusted request rate.

11. The method of claim 9, further comprising updating the request rate included in the proxy object.

12. A computer implemented method for enabling a service provider system to access a lookup service at a server, comprising:
    accessing, with the service provider system, a lookup service proxy object from the server that includes code to enable the service provider system to communicate with the server to register and access proxy objects with the lookup service, and wherein the lookup service proxy object includes a request rate indicating a rate at which the service provider system transmits requests to the server to access the lookup service;
    generating requests, with the service provider system, to access the lookup service using code included in the accessed lookup service proxy object; and
    transmitting, with the service provider system, the generated requests for the lookup service to the server at the request rate included in the lookup service proxy object.

13. The method of claim 12, further comprising;
    dynamically adjusting the lookup service request rate depending on a request load at the server; and
    communicating, with the server, the adjusted lookup service request rate to the service provider system, wherein after receiving the adjusted lookup service request rate the requests for the lookup service are submitted at the adjusted lookup service request rate.

14. The method of claim 12, wherein at least one request transmitted by the service provider system comprises a request to register a service proxy object with the lookup service, wherein the registered service proxy object enables a client to access the service through the service provider system over a network, and wherein the registered service proxy object includes a service request rate indicating a rate at which the client transmits requests to the service provider system to access the service.

15. The method of claim 14, wherein the service request rate and lookup service request rate are capable of being different.

16. The method of claim 14, further comprising:
    dynamically adjusting the service request rate depending on a request load at the service provider system;
    communicating the service request rate to the client, wherein after receiving the adjusted service request rate the client submits requests for the service at the adjusted service request rate.

17. A system for enabling access to a service, comprising:
    a client;
    a server;
    a communication interface enabling communication between the client and the server;
    client code embedded in a client computer readable medium capable of causing the client to perform:
        (i) accessing a proxy object over the communication interface, wherein the proxy object includes code to enable the client to access the service from the server, wherein the accessed proxy object includes a request rate indicating a rate at which the client transmits requests for the service;
        (ii) generating requests for the service from the server using code included in the proxy object; and
        (iii) transmitting the generated requests for the service to the server at the request rate included in the proxy object;
    server code embedded in a server computer readable medium capable of causing the server to enable the client using the proxy object to access the service over the communication interface.

18. The system of claim 17, wherein the request rate causes the client to serially transmit requests for the service.

19. The system of claim 17, wherein the request rate causes the client to delay submitting a subsequent request for the service for a period of time indicated in the request rate.

20. The system of claim 17, wherein the request rate causes the client to concurrently submit a predetermined number of requests indicated in the proxy object for the service.

21. The system of claim 17, wherein the client transmits the request for the service to the server, and wherein the server code enables the server to provide access to the service.

22. The system of claim 17, further comprising:
a lookup server, wherein the communication interface enables communication among the server, client and lookup server;
a lookup service implemented in the lookup server, wherein the client accesses the proxy object from the lookup service.

23. The system of claim 17, wherein the server code is further capable of causing the server to perform:
queuing requests for the service; and
processing the queued requests for the service at a server rate.

24. The system of claim 17, wherein the server code is further capable of causing the server to perform:
dynamically adjusting the request rate depending on a request load for the service, wherein the the adjusted request rate is communicated to the client to cause the client to submit requests for the service at the adjusted request rate.

25. The system of claim 24, wherein the server code is further capable of causing the server to update the request rate included in the proxy object.

26. A computer system for enabling access to a lookup service, comprising:
(a) a server;
(b) a service provider system;
(c) a communication interface enabling communication between the server and the service provider system;
(d) server code implemented in a server computer readable medium capable of causing the server to perform:
  (i) maintaining the lookup service; and
  (ii) transmitting to the service provider system a lookup service proxy object including code to enable the service provider system to communicate with the server to accesses the lookup service, and wherein the lookup service proxy object includes a request rate indicating a rate at which the service provider system transmits requests to the server to access the lookup service;
(e) service provider code implemented in a service provider computer readable medium capable of causing the service provider system to perform:
  (i) generating requests to access the lookup service using code included in the accessed lookup service proxy object; and
  (ii) using the lookup service proxy object to transmit the generated requests for the lookup service at the request rate included in the lookup service proxy object.

27. The system of claim 26, wherein the server code is further capable of causing the server to perform:
dynamically adjusting the lookup service request rate depending on a request load at the server; and
communicating the adjusted lookup service request rate to the service provider system, wherein after receiving the adjusted lookup service request rate the requests for the lookup service are submitted at the adjusted lookup service request rate.

28. The system of claim 26, further comprising:
a client, wherein the communication interface is further capable of enabling communication among the server, the service provider system, and the client, wherein at least one request transmitted by the service provider system to the server us9ing the lookup service proxy object comprises a request to register a service proxy object with the lookup service, wherein the registered service proxy object enables the client to access the service through the service provider system over a network, and wherein the registered service proxy object includes a service request rate indicating a rate at which the client transmits requests to the service provider system to access the service.

29. The system of claim 28, wherein the service request rate and lookup service request rate are capable of being different.

30. The system of claim 29, wherein the service provider code is further capable of causing the service provider system to perform:
dynamically adjusting the service request rate depending on a request load at the service provider system, wherein the service request rate is communicated to the client, and wherein after receiving the adjusted service request rate the client submits requests for the service at the adjusted service request rate.

31. An article of manufacture including for enabling a client to access a service at a server, wherein the code comprises:
(a) client code capable of causing the client to perform:
  (i) accessing a proxy object, wherein the proxy object includes code to enable the client to access the service from the server, wherein the accessed proxy object includes a request rate indicating a rate at which the client transmits requests for the service;
  (ii) generating requests for the service from the server using code included in the proxy object; and
  (iii) transmitting the generated requests for the service to the server at the request rate included in the proxy object;
(b) server code capable of causing the server to enable the client using the proxy object to access the service over the communication interface.

32. The article of manufacture of claim 31, wherein the request rate causes the client to serially transmit requests for the service.

33. The article of manufacture of claim 31, wherein the request rate causes the client to delay submitting a subsequent request for the service for a period of time indicated in the request rate.

34. The article of manufacture of claim 31, wherein the request rate causes the client to concurrently submit a predetermined number of requests indicated in the proxy object for the service.

35. The article of manufacture of claim 31, wherein the client transmits the request for the service to the server, and wherein the server code is further capable of enabling the server to provide access to the service.

36. The article of manufacture of claim 31, wherein the client accesses the proxy object from a lookup service.

37. The article of manufacture of claim 31, wherein the server code is further capable of causing the server to perform:
queuing requests for the service; and
processing the queued requests for the service at a server rate.

38. The article of manufacture of claim 31, wherein the server code is further capable of causing the server to perform:
dynamically adjusting the request rate depending on a request load for the service, wherein the the adjusted request rate is communicated to the client to cause the client to submit requests for the service at the adjusted request rate.

39. The article of manufacture of claim 31, wherein the server code is further capable of causing the server to update the request rate included in the proxy object.

40. An article of manufacture including code for enabling a service provider system to access a lookup service at a server, wherein the code comprises:

40. An article of manufacture including code for enabling a service provider system to access a lookup service at a server, wherein the code comprises:
(a) server code capable of causing the server to perform:
 (i) maintaining the lookup service; and
 (ii) registering received service proxy objects with the lookup service including at least one service proxy object, wherein the service proxy object includes code to enable the service provider system to communicate with the server to access the lookup service, and wherein the lookup service proxy object includes a request rate indicating a rate at which the service provider system transmits requests to the server to access the lookup service;
(b) service provider code capable of causing the service provider system to perform:
 (i) generating requests to access the lookup service using code included in the accessed lookup service proxy object; and
 (ii) using the lookup service proxy object to transmit the generated requests for the lookup service at the request rate included in the lookup service proxy object.

41. The article of manufacture of claim 40, wherein the server code is further capable of causing the server to perform:
dynamically adjusting the lookup service request rate depending on a request load at the server; and
communicating the adjusted lookup service request rate to the service provider system, wherein after receiving the adjusted lookup service request rate the requests for the lookup service are submitted at the adjusted lookup service request rate.

42. The article of manufacture of claim 40, wherein at least one request transmitted by the service provider system comprises a request to register a service proxy object with the lookup service using the lookup service proxy object, wherein the registered service proxy object enables a client to access the service through the service provider system, and wherein the registered service proxy object includes a service request rate indicating a rate at which the client transmits requests to the service provider system to access the service.

43. The article of manufacture of claim 42, wherein the service request rate and lookup service request rate are capable of being different.

44. The article of manufacture of claim 42, wherein the service provider code is further capable of causing the service provider system to perform:
dynamically adjusting the service request rate depending on a request load at the service provider system, wherein the service request rate is communicated to the client, and wherein after receiving the adjusted service request rate the client submits requests for the service at the adjusted service request rate.

45. A computer readable medium include a proxy object to enable a client to access a server, wherein the proxy object includes:
code to enable the client to access a service from the server; and
a request rate indicating a rate at which the client transmits requests for the service, wherein the client uses the code in the proxy object to generate and transmit requests for the service at the server at the request rate included in the proxy object.

46. The computer readable medium of claim 45, wherein the request rate causes the client to serially transmit requests for the service.

47. The computer readable medium of claim 45, wherein the request rate causes the client to delay submitting a subsequent request for the service for a period of time indicated in the request rate.

48. The computer readable medium of claim 45, wherein the request rate causes the client to concurrently submit a predetermined number of requests indicated in the proxy object for the service.

49. The computer readable medium of claim 45, wherein the request rate is capable of being dynamically adjusted depending on a request load at the server for the service.

50. A computer readable medium including one or more proxy objects accessible to a processing unit, wherein the computer readable medium includes a lookup service proxy object to enable a service provider system to access a lookup service at a server, wherein the lookup service proxy object includes:
code to enable the service provider system to communicate with the server to register and access service proxy objects with the lookup service; and
a request rate indicating a rate at which the service provider system transmits requests to the server to access the lookup service, wherein the service provider system uses the code in the lookup proxy object to generate and transmit requests to access the lookup service at the request rate included in the lookup service proxy object.

51. The computer readable medium of claim 50, wherein the lookup service request rate is capable of being dynamically adjusted depending on a request load at the server.

52. The computer readable medium of claim 50, further comprising:
a service proxy object that includes:
 (i) code for enabling a client to access as service through the service provider system over a network; and
 (ii) a service request rate indicating a rate at which the client transmits requests to the service provider system to access the service, wherein the lookup service proxy object further includes code to enable the service provider to register the service proxy object with the lookup service.

53. The computer readable medium of claim 52, wherein the service request rate and lookup service request rate are capable of being different.

54. The computer readable medium of claim 52, wherein the service request rate is capable of being dynamically depending on a request load at the service provider system.

* * * * *

UNITED STATES PATENT AND TRADEMARK OFFICE
CERTIFICATE OF CORRECTION

PATENT NO. : 6,795,864 B2
DATED : September 21, 2004
INVENTOR(S) : William H. Connor It is certified that error appears in the above-identified patent and that said Letters Patent is hereby corrected as shown below:

Column 11,
Lines 1-3, please delete these lines as they were repeated from Column 10.

Signed and Sealed this

Twenty-eighth Day of December, 2004

JON W. DUDAS
*Director of the United States Patent and Trademark Office*